(12) United States Patent
Elnozahy

(10) Patent No.: US 6,347,383 B1
(45) Date of Patent: Feb. 12, 2002

(54) METHOD AND SYSTEM FOR ADDRESS TRACE COMPRESSION THROUGH LOOP DETECTION AND REDUCTION

(75) Inventor: Elmootazbellah Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,878

(22) Filed: Mar. 31, 1999

(51) Int. Cl.$^7$ .................................................. G06F 11/00
(52) U.S. Cl. ....................................... 714/53; 709/315
(58) Field of Search ............................ 714/53, 47, 45, 714/43, 42, 39, 38, 37, 35; 709/315, 330

(56) References Cited

U.S. PATENT DOCUMENTS

| | | | | |
|---|---|---|---|---|
| 5,446,876 A | * | 8/1995 | Levine et al. | 395/184.01 |
| 5,764,885 A | * | 6/1998 | Sites et al. | 395/183.21 |
| 5,802,272 A | * | 9/1998 | Sites et al. | 395/183.21 |
| 5,951,623 A | * | 9/1999 | Reynar et al. | 708/203 |
| 6,112,319 A | * | 8/2000 | Paulson | 714/49 |

OTHER PUBLICATIONS

IBM Tech. Disclosure, Bull. Automatic loop detector/Eliminator, Aug. 1980, 1 of 2, TDB–ACC–NO: NN8008919.*
IBM Tech. Disclosure, Bull. Trace mechanism with Hang or loop detection, Feb. 1, 1980, 1 of 1, TDB–ACC–NO: NN80024138.*
IBM Tech. Disclosure, Bull, Programmable loop Detector/Eliminator, Aug. 1979, 1 of 3, TDB–ACC–NO: NN79081158.*
IBM Tech. Disclosure Bull, Address trace compressor, Nov. 1972, 1 of 2, TDB–ACC–NO: NN72111866.*

* cited by examiner

*Primary Examiner*—Nadeem Iqbal
(74) *Attorney, Agent, or Firm*—Casimer K. Salys; Bracewell & Patterson, L.L.P.

(57) ABSTRACT

A method and system for compressing memory address traces based on detecting and reducing the loops that exist in a trace is disclosed. The method and system consists of two steps. In the first step, the trace is analyzed and loops are detected by determining the control flow among the program basic blocks. In the second step, each loop is analyzed to eliminate constant address references, and to apply compiler-like strength reduction on addresses that differ only by a fixed offset between consecutive loop iterations. Addresses that cannot be eliminated using the method and system of the present invention are kept in the trace.

20 Claims, 5 Drawing Sheets

| | | |
|---|---|---|
| Trace Record { | Instruction block address | 0x108a2430 |
| | Constant data address | 0xf0080004 |
| | Segment address | 0x07018000 |

| | | | |
|---|---|---|---|
| | | 0x108a2434 | |
| Loop-variant address 42 | | 0x200ef008 | Iteration 1 |
| | | 0x010829a0 | 46 |
| | | 0x108a2438 | |
| Variable address 44 | | 0xf0081120 | |
| | | 0x07018000 | |
| | | 0x108a2430 | |
| Constant data address 40 | | 0xf0080004 | |
| | | 0x07018000 | |
| | | 0x108a2434 | |
| Loop-variant address 42 | | 0x200ef00c | Iteration 2 |
| | | 0x010829a0 | 48 |
| | | 0x108a2438 | |
| Variable address 44 | | 0xf008bbcc | |
| | | 0x07018000 | |
| | | 0x108a2430 | |
| Constant data address 40 | | 0xf0080004 | |
| | | 0x07018000 | |
| | | 0x108a2434 | |
| Loop-variant address 42 | | 0x200ef010 | Iteration 3 |
| | | 0x010829a0 | 50 |
| | | 0x108a2438 | |
| Variable address 44 | | 0xf008ee40 | |
| | | 0x07018000 | |

*Fig. 4*

Loop descriptor: ⌐104

| | |
|---:|---|
| 3 | 0x108a2430 |
| +0 | 0xf0080004 | ⌐52
| +4 | 0x200ef008 | ⌐54
| -1 | 0x00000000 | ⌐56

Segment register descriptor: ⌐102

| | |
|---:|---|
| 2 | 0x010829a0 |
| 15 | 0x07018000 |

Random address values: ⌐58

| |
|---|
| 0xf0081120 |
| 0xf008bbcc |
| 0xf008ee40 |

*Fig. 5*

METHOD AND SYSTEM FOR ADDRESS TRACE COMPRESSION THROUGH LOOP DETECTION AND REDUCTION

BACKGROUND OF THE INVENTION

1. Technical Field

The present invention relates in general to a method and system for data processing and in particular to an improved method and system for address trace compression. Still more particularly, the present invention relates to a method and system for address trace compression utilizing loop detection and reduction techniques.

2. Description of the Related Art

The use of memory address traces has long been established as a technique for studying and predicting the performance of computer systems. The fundamental concepts underlying these techniques are relatively simple, but the engineering involved for constructing, managing and using the address traces is often very complex in practice. Traces must be gathered with minimum perturbation to the system being traced, and information is preferably limited only to the absolute minimum that will be used later in simulating an existing or a future architecture. Also, as processor speeds continue to increase, then for a given period of real time, the size of an address trace increases in proportion to the processor speed.

Additionally, it is becoming clear that to provide acceptable estimates for the system performance, long traces are needed. Such traces include the effects of context switches, inputs and outputs, network traffic etc. Ambitious performance studies would like to observe the system for tens of seconds or minutes if possible. This requirement necessitates long traces and disk speeds are not improving. Extremely long traces consume substantial storage space and cause the simulator to become I/O bound, instead of CPU bound. It may be argued that storage costs and capacities are decreasing at rates comparable or exceeding those of the processor speeds. While this is true, nobody finds the management of terabytes of trace volumes a simple undertaking.

Consequently, it would be desirable to provide an improved method and system for compressing an existing trace during post-mortem through detecting and reducing the loops that manifest in an address trace. The method and system of the present invention relies on the observation that most programs spend their time executing loops, and therefore the trace will follow the structures of such loops. If loops could therefore be detected, then compiler-like techniques could eliminate many of the address references that could later be constructed while the trace is read back. The subject invention herein solves all of these problems in a new and unique manner that has not been part of the art previously.

SUMMARY OF THE INVENTION

It is therefore one object of the present invention to provide an improved method and system for reducing the storage required by the address trace.

It is another object of the present invention to provide an improved method and system for simple reconstruction of the trace during post-mortem simulation.

The foregoing objects are achieved as is now described. A method and system for compressing memory address traces based on detecting and reducing the loops that exist in a trace is disclosed. The method and system consists of two steps. In the first step, the trace is analyzed and loops are detected by determining the control flow among the program basic blocks. In the second step, each loop is analyzed to eliminate constant address references, and to apply compiler-like strength reduction on addresses that differ only by a fixed offset between consecutive loop iterations. Addresses that cannot be eliminated using the method and system of the present invention are kept in the trace.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a resulting trace record using standard control flow analysis; and

FIG. 5 are the resulting compressed files in accordance with the method of the present invention;

DETAILED DESCRIPTION OF ILLUSTRATIVE EMBODIMENT

Figure 1:
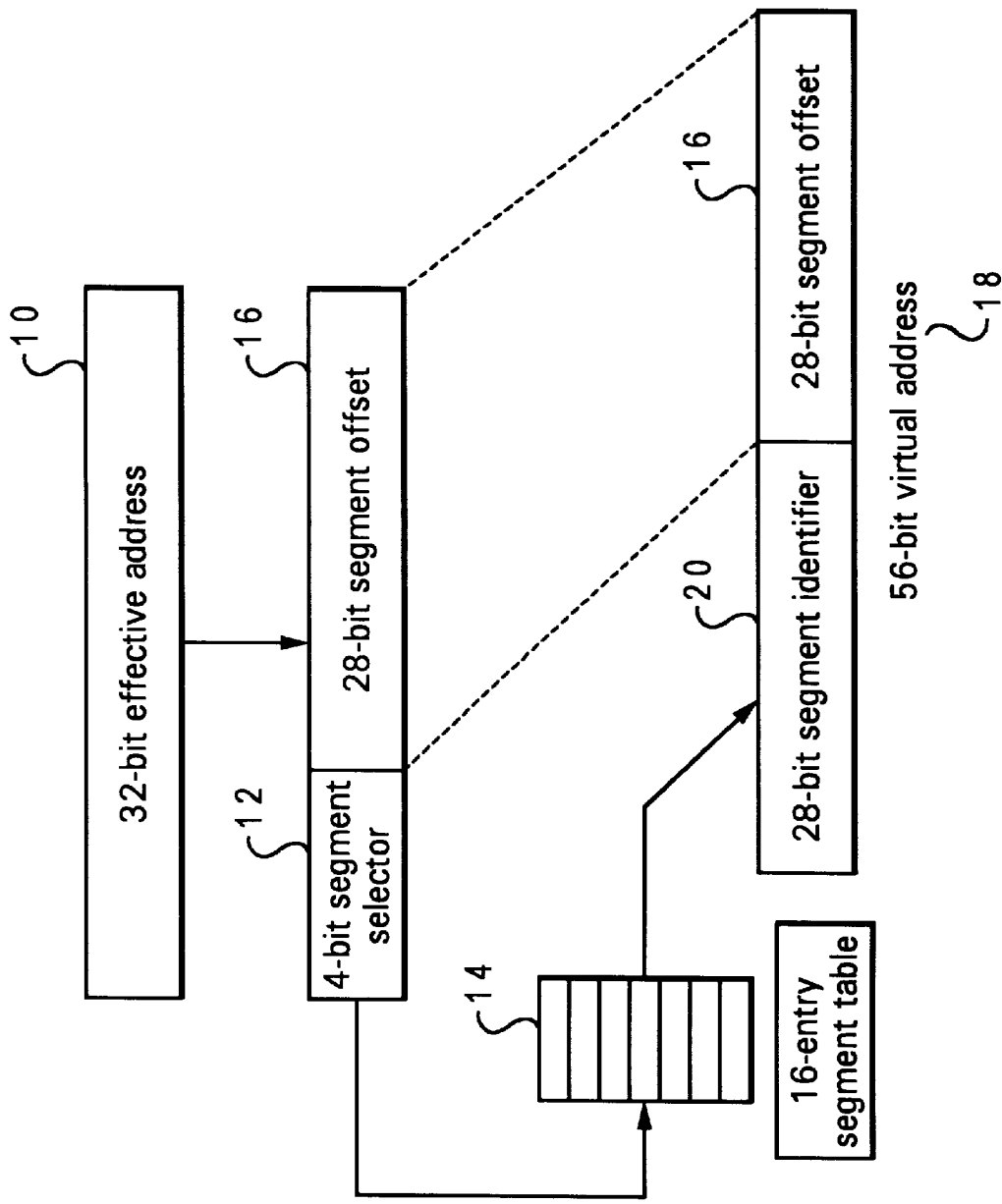
FIG. 1 illustrates one type of addressing scheme that may use the loop detection and reduction method of the present invention.

With reference now to the figures and in particular with reference to FIG. 1, there is illustrated one type of addressing scheme in the context of the PowerPC architecture and the AIX operating system owned by International Business Machines. The PowerPC architecture has an unusual address translation scheme that places more pressure on the trace gathering utility and requires more space to save the trace than other architectures. The method and system of the present invention has implemented loop detection and reduction as part of an exemplary trace tool framework and using the trace format associated with this tool.

Turning once again to FIG. 1, user programs see 32-bit addresses 10 that are called "effective addresses". These are converted first into virtual addresses using a segmented architecture as follows. The four upper bits 12 of an effective address 10 are considered to be an index into an array of segment registers (16 registers) 14. A memory management unit (MMU) concatenates the contents of the corresponding segment register (28-bit) 20 with the lower 28 bits 16 of the effective address 10 to generate a 56-bit virtual address 18. This 56-bit virtual address 18 is then presented to the TLB for translation to a real memory address. The segment registers 14 are set and read only by a kernel. User programs are totally oblivious to this two-level translation step. There are many benefits to this form of address translation, including facilitating memory sharing and efficient shared library support, among others, but a discussion of these benefits is beyond the scope of the invention. This address translation scheme, however, has some implications on how tracing could be done. For an accurate study of a memory cache system, a trace must contain the 56-bit virtual address 18 and not the 32-bit effective addresses 10. This is true because many segments are shared among independent processes (e.g., kernel, shared libraries, mapped files), and a trace containing only the 32-bit addresses 10 will not reveal such sharing and will disturb the accuracy of studying the cache performance using the trace.

Figure 6:
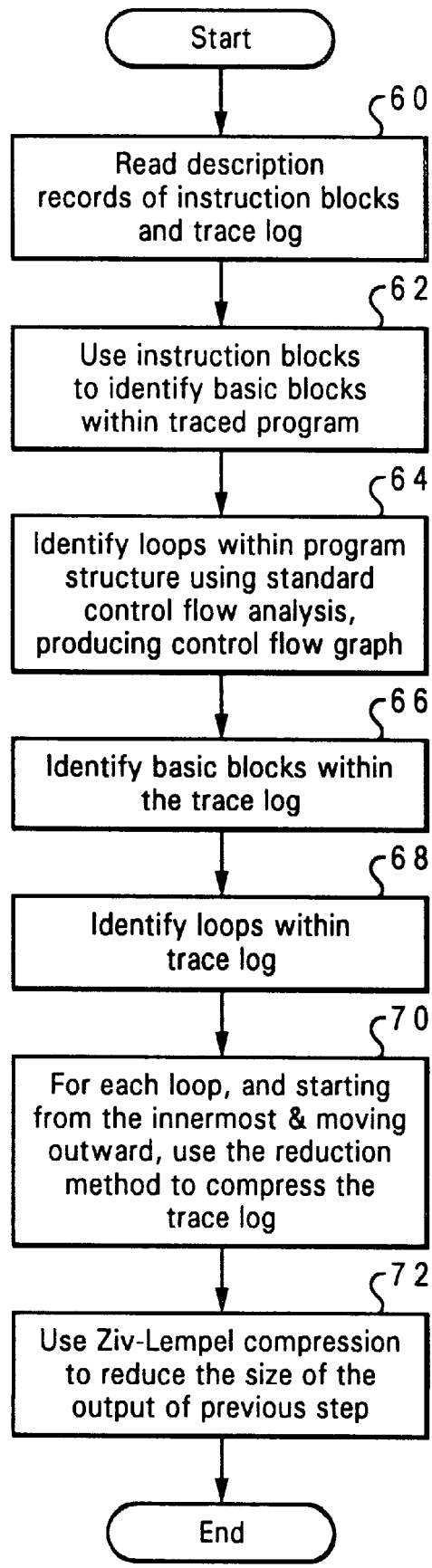
FIG. 6 depicts a flowchart showing the overall sequence of taking and compressing a trace using a tracing tool in association with the method of the present invention.

Referring throughout to FIG. 6, there is depicted a flowchart showing the overall sequence of taking and compressing a trace using the aforementioned tracing tool used in association with the further compression technique of the present invention. First though, it follows that traditional tracing mechanisms based on program instrumentation would not succeed in generating the required information, because such instrumentation only deals with effective addresses, not virtual addresses. Therefore, kernel level access is essential to be able to read the segment registers and record them in the trace. Furthermore, the large 56-bit virtual addresses puts more pressure on the trace buffer and generates larger file sizes than other architectures. The tracing tool utilized in association with the present invention depends on a combination of hardware assist and simple kernel level instrumentation to capture memory references during a trace. The hardware assist consists of special registers in the PowerPC processor architecture that force a processor interrupt when specific events occur. The software instrumentation is in the kernel and consists of an interrupt handling routine that takes over whenever the hardware assist forces an interrupt. To generate a trace, the registers are set to interrupt the processor whenever an instruction generates a load or store, a branch instruction executes (conditional or otherwise), or an interrupt occurs that interrupts the sequential flow of the program (hardware interrupts or software signals, for instance). In any of these cases, the operating system takes over and the interrupt handling routine generates a trace record containing the 32-bit effective address of the instruction, in addition to the 56-bit virtual address of the data being loaded or stored, if applicable.

The tracing tool used in association with the present invention tool stores only the effective address of the instruction because the segment containing the user code does not usually change during a process's life time. Therefore, the segment register containing the code (segment 1, by convention) is recorded whenever a context switch occurs, but is not recorded thereafter for each instruction. The trace generation routine generates the 56-bit virtual address by simply recording the 32-bit effective address and the value of the corresponding segment register, mimicking the MMU translation. Since segment registers change all the time due to linking with dynamic libraries, mapping files, etc., no simple optimization is possible to reduce the size of the data reference address like reduction was possible for the address of the instruction.

Figure 2:
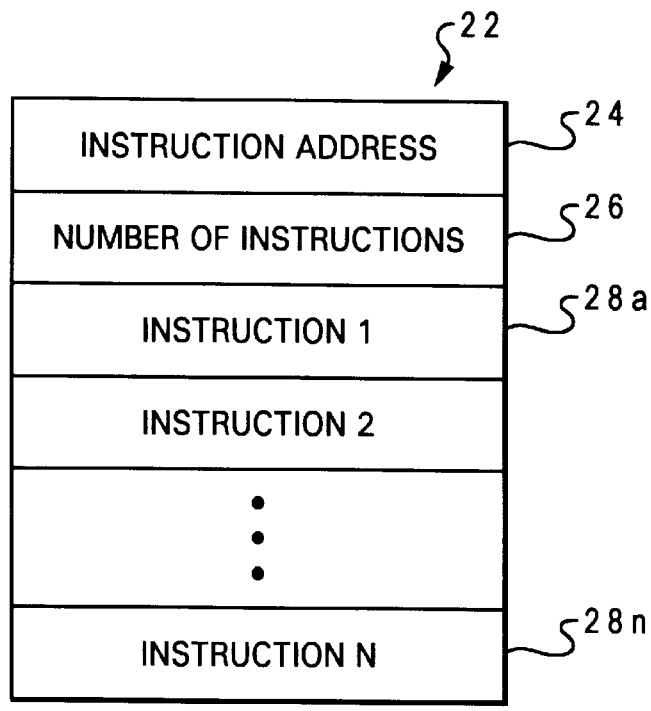
FIG. 2 is an auxiliary file recovered from the trace log.

Turning once again to FIG. 6, after the trace is gathered, block 60 depicts scaning the trace by reading the description records of instructions and the trace log which is recovered into an auxiliary file 22. Referring to FIG. 2, this file 22 contains for each basic block, the leading instruction address 24 and the number of instructions 26 of instructions 28a–28n in the basic block. The trace is processed to contain only the addresses of instructions 24 that are in the leading positions of basic blocks, and those that follow or precede an interrupt or a context switch. The addresses filtered out can be reconstructed easily during simulation by simply keeping track of the program counter value for each process in the trace.

Figure 3:
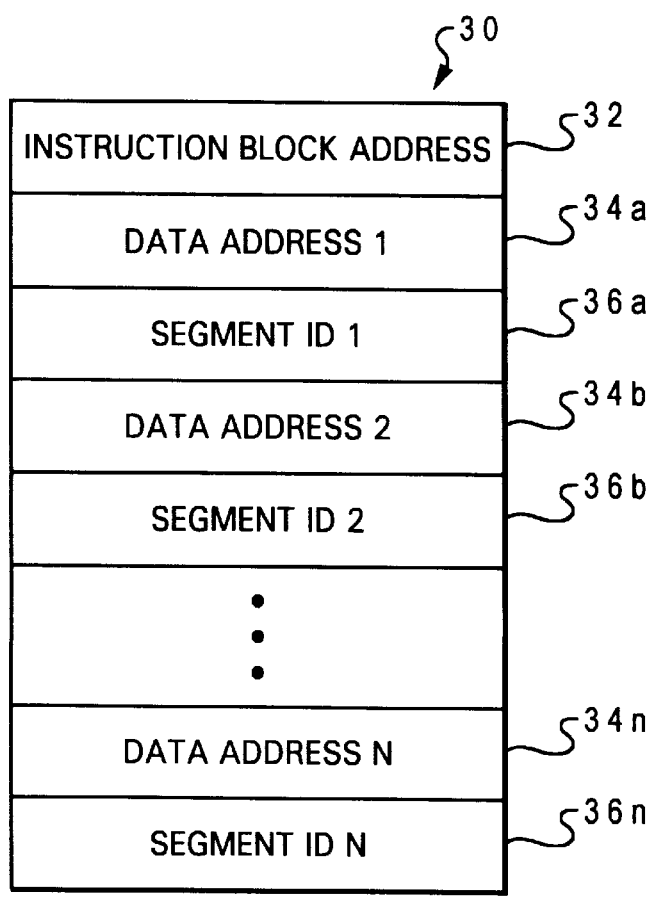
FIG. 3 is a resulting format used to identify the basic blocks within the traced program.

Turning once again to FIG. 6, the process then proceeds to step 62 wherein the instruction blocks are used to identify the basic blocks within the traced program. Referring now to FIG. 3, the resulting trace format therefore consists of the following format 30: addresses of instructions 32 that are leading the basic blocks as they occur during the trace (32-bit), addresses of instructions 32 that precede or follow a context switch (32-bit), or addresses of items loaded or stored (56-bit rounded up to 64-bit per address) 34a–34n and 36a–36n.

Next, the method of the present invention identifies loops within the program structure using standard control flow analysis in step 64 resulting in the trace record shown in FIG. 4. Informally, a loop construct is defined as a sequence of basic blocks such that there is only one entry to the sequence from outside, and there are backward branches to that entry from within the sequence. This is a conventional definition that has been used in the prior art in program optimization in the compiler area. Loops may be nested, and such nesting detected by traditional control flow techniques adapted to read and analyze the trace instruction flow. Therefore, for the purpose of compressing the trace, there are identified three types of load and stores within a loop. Referring to FIG. 4, the first type of loop are constant addresses 40. These do not change from one loop iteration to the next. This occurs for example when a stack variable is repeatedly read into a register (spill code), or some similar situation. The second are offset or loop-variant addresses 42. These addresses 42 change from one iteration of the loop to the next by a fixed offset. The third is chaotic, random or variable addresses 44. These addresses 44 change from one iteration of the loop to the next without following any clear pattern.

Turning once again to FIG. 6, the process then identifies the basic blocks and loops within the trace log in steps 66 and 68, as shown by blocks 46, 48 and 50 in FIG. 4. In accordance with the teachings of the present invention, the next step 70 (loop reduction) after identifying the loops is to identify address references and classify them according to the above definitions as shown in FIG. 5. Constant 52 and offset 54 address references are encoded once in the loop body, while chaotic 56 address references have to be included in the sequence in which they appear within the trace. In addition, the loop description includes the values of the segment registers that are being utilized in loop 102. Depending on the trace, and how uniform the loops are, the loop detection and reduction technique of the present invention yields moderate to substantial savings. Additionally, the loop description is followed by a list of the chaotic addresses 58 that occur in the loop.

By way of example, but not of limitation, the loop detection and reduction method of the present invention may be illustrated by considering the following code fragment, (j=0; j<n;j++) a[j]=b[j]*c[j]. The code generated for this fragment will typically consist of loading the addresses of the vectors a, b and c in some processor registers, and then using a register to index through the loop. In a trace, the resulting trace records will show repeated execution of the same basic block with the data addresses differing between one iteration and the next by a constant offset. Therefore, by detecting such a loop from the trace file, one may replace all the occurrences as shown in FIG. 5 with the following encoding in loop descriptor 104:

loop: starting address offsets: +4,+4,+4 n times

Additionally, care must be taken in the analysis in ensuring that the loops are following the same sequence of address transitions. In particular, some complex loops may contain jumps to functions, or some loops can contain complex intra-loop branches that will change the structure of the trace records from one loop iteration to the next and therefore need to be an individually recorded. In such situations, it becomes very difficult if not impossible for the analyzer to detect any patterns, and the effectiveness of the technique is greatly hampered. As an example, consider the following code fragment, (j=0;j<n;j++) a[j]=d[bsearch(a[j]). In this case the address generated for the vector d depends on the result of executing a complex binary search function. In situations like this, the analyzer only detects the addresses of the vector as an offset address, but otherwise each loop iteration must be included in the trace because of the chaotic nature of generating the address of the elements of d. Nevertheless, even with such restrictions, the simple cases are enough to generate substantial reduction.

Lastly, in step 72 of FIG. 6, the resulting tables of FIG. 5 are further reduced utilizing Ziv-Lempel compression to reduce the size of the output. It should be appreciated that the method and system of the present invention for loop detection and reduction can be an effective means for reducing the storage required by the address trace. Furthermore, the encoding of a loop lends itself directly to simple reconstruction of the trace during post-mortem simulation. This simplicity, along with the reduction of overhead of reading the entire trace file makes the recovery of a trace very efficient.

It is also important to note that although the present invention has been described in the context of a fully functional address trace compression technique through loop detection and reduction, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for address trace compression, said method comprising the steps of:
   determining control flow among basic blocks of code for detecting loops within an address trace; and
   eliminating redundant address references within each said detected loop wherein said address trace is compressed by reducing said loops in said address trace.

2. The method for address trace compression according to claim 1, wherein determining control flow further comprising the step of:
   detecting nesting for said loops.

3. The method for address trace compression according to claim 1, wherein determining control flow further comprising the step of:
   identifying load and stores within said loops.

4. The method for address trace compression according to claim 1, wherein eliminating redundant address references further comprising the step of:
   eliminating constant address references.

5. The method for address trace compression according to claim 1, wherein eliminating redundant address references further comprising the step of:
   eliminating variable address references that vary by a fixed offset between loop iterations.

6. The method for address trace compression according to claim 1, wherein eliminating redundant address references further comprising the step of:
   keeping random address references wherein said random address references change for each loop iteration without a particular pattern of change.

7. The method for address trace compression according to claim 1, wherein said address trace is compressed further comprising the step of:
   using Ziv-Lempel compression on said reduced loops.

8. An information handling system for address trace compression, comprising:
   means for determining control flow among basic blocks of code for detecting loops within an address trace; and
   means for eliminating redundant address references within each said detected loop wherein said address trace is compressed by reducing said loops in said address trace.

9. The information handling system for address trace compression according to claim 8, comprising:
   means for detecting nesting for said loops.

10. The information handling system for address trace compression according to claim 8, comprising:
    means for identifying load and stores within said loops.

11. The information handling system for address trace compression according to claim 8, comprising:
    means for eliminating constant address references.

12. The information handling system for address trace compression according to claim 8, comprising:
    means for eliminating variable address references that vary by a fixed offset between loop iterations.

13. The information handling system for address trace compression according to claim 8, comprising:
    means for keeping random address references wherein said random address references change for each loop iteration without a particular pattern of change.

14. The information handling system for address trace compression according to claim 8, comprising:
    means for using Ziv-Lempel compression on said reduced loops.

15. A computer product residing on a computer usable medium for address trace compression through loop detection and reduction in a data processing system having more than one processor clock, comprising:
    instruction means for determining control flow among basic blocks of code for detecting loops within an address trace; and
    instruction means for eliminating redundant address references within each said detected loop wherein said address trace is compressed by reducing said loops in said address trace.

16. The computer product according to claim 15, comprising:
    instruction means for detecting nesting for said loops.

17. The computer product according to claim 15, comprising:
    instruction means for identifying load and stores within said loops.

18. The computer product according to claim 15, comprising:
    instruction means for eliminating constant address references.

19. The computer product according to claim 15, comprising:
    instruction means for eliminating variable address references that vary by a fixed offset between loop iterations.

20. The computer product according to claim 15, comprising:
    instruction means for keeping random address references wherein said random address references change for each loop iteration without a particular pattern of change.

* * * * *